United States Patent [19]

Seed

[11] 4,353,347

[45] Oct. 12, 1982

[54] PORTABLE COOKER

[75] Inventor: Kenneth J. Seed, Vancouver, Canada

[73] Assignee: Barba Grill Inc., Vancouver, Canada

[21] Appl. No.: 39,103

[22] Filed: May 15, 1979

[51] Int. Cl.$^3$ .................. A47J 37/00; A47J 27/00
[52] U.S. Cl. .................. 126/41 R; 126/25 R;
99/446; 99/450
[58] Field of Search .................. 126/41 R, 251, 9 R,
126/9 B; 74/543; 16/110 A, 125, 126; 220/318,
319, 315, 322, 324; 99/446, 450

[56] References Cited

U.S. PATENT DOCUMENTS

| 1,010,037 | 11/1911 | Frisz | 16/126 |
|---|---|---|---|
| 1,355,332 | 10/1920 | Hanson | 16/126 |
| 3,171,398 | 3/1965 | Lawson | 126/9 R |
| 3,785,275 | 1/1974 | Keats et al. | 126/25 R |
| 3,877,458 | 4/1975 | Allander | 126/9 R |
| 3,946,893 | 3/1976 | Bowersmith | 220/318 |
| 4,108,142 | 8/1978 | Barson et al. | 126/25 R |
| 4,127,914 | 12/1978 | Fischbach | 16/110 A |

FOREIGN PATENT DOCUMENTS 530841 of 0000 Fed. Rep. of Germany ...... 126/9 B

*Primary Examiner*—Samuel Scott
*Assistant Examiner*—Wesley S. Ratliff, Jr.
*Attorney, Agent, or Firm*—Carver and Company

[57] ABSTRACT

A portable cooker for connecting to a pressurized gas supply and being adapted for easy assembly and disassembly. When assembled, a rigid gas delivery tube extends from a gas bottle and carries a ventilated support having a fixed burner disposed centrally of the support. A dished cooking pan is supported on the support rim and is shaped so that when the cooker is dismantled for storage, the pan can be reversed on the support to form with the support an enclosure to receive the tube when disassembled. A pair of support handles extend from the support to engage the pan periphery when the cooker is dismantled and the pan is reversed, so as to latch the pan and support together. A pair of pan handles extend from the pan and cooperate with the support handles to reduce movement between the pan and support when assembled.

11 Claims, 6 Drawing Figures

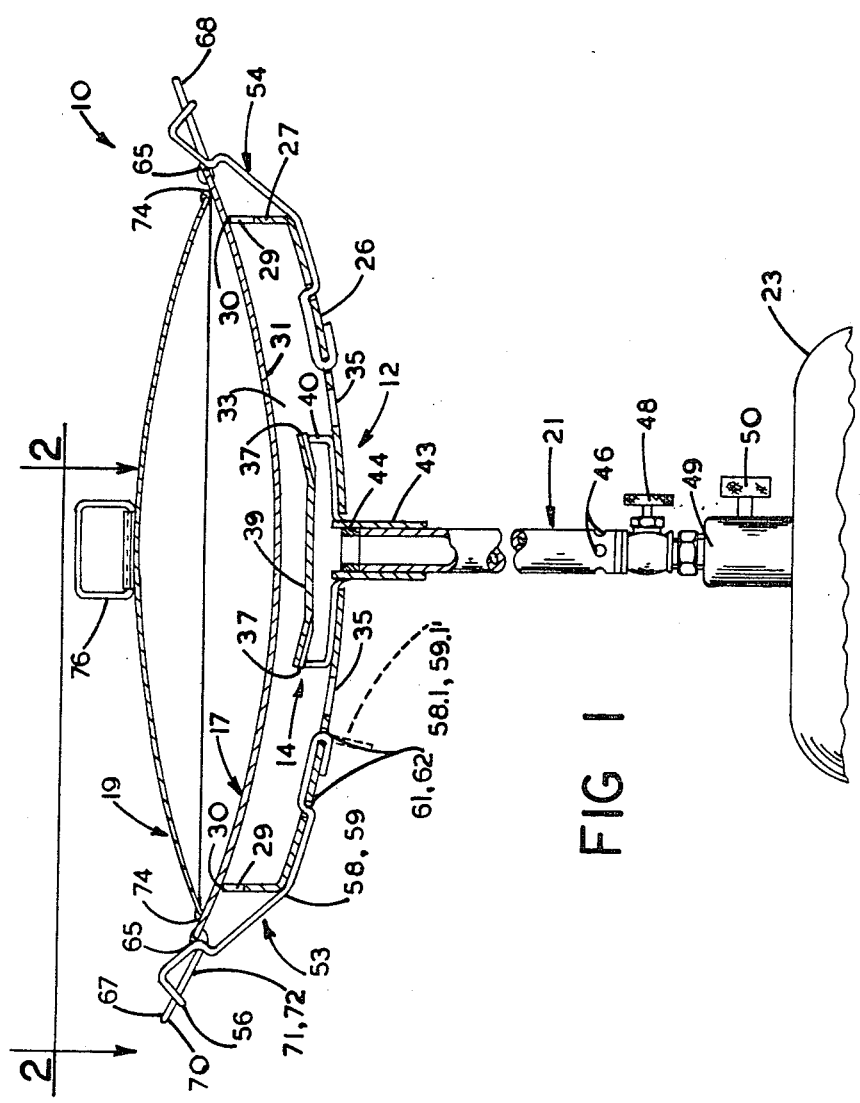

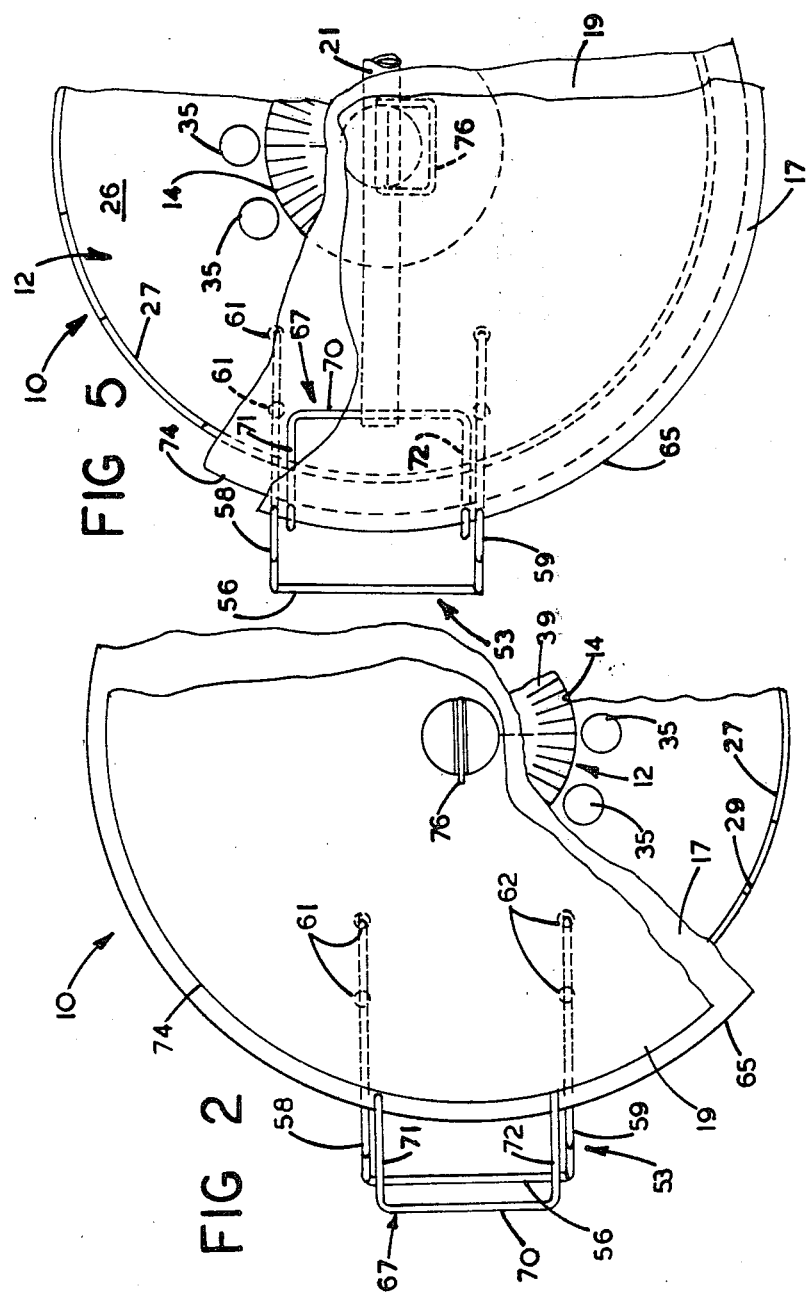

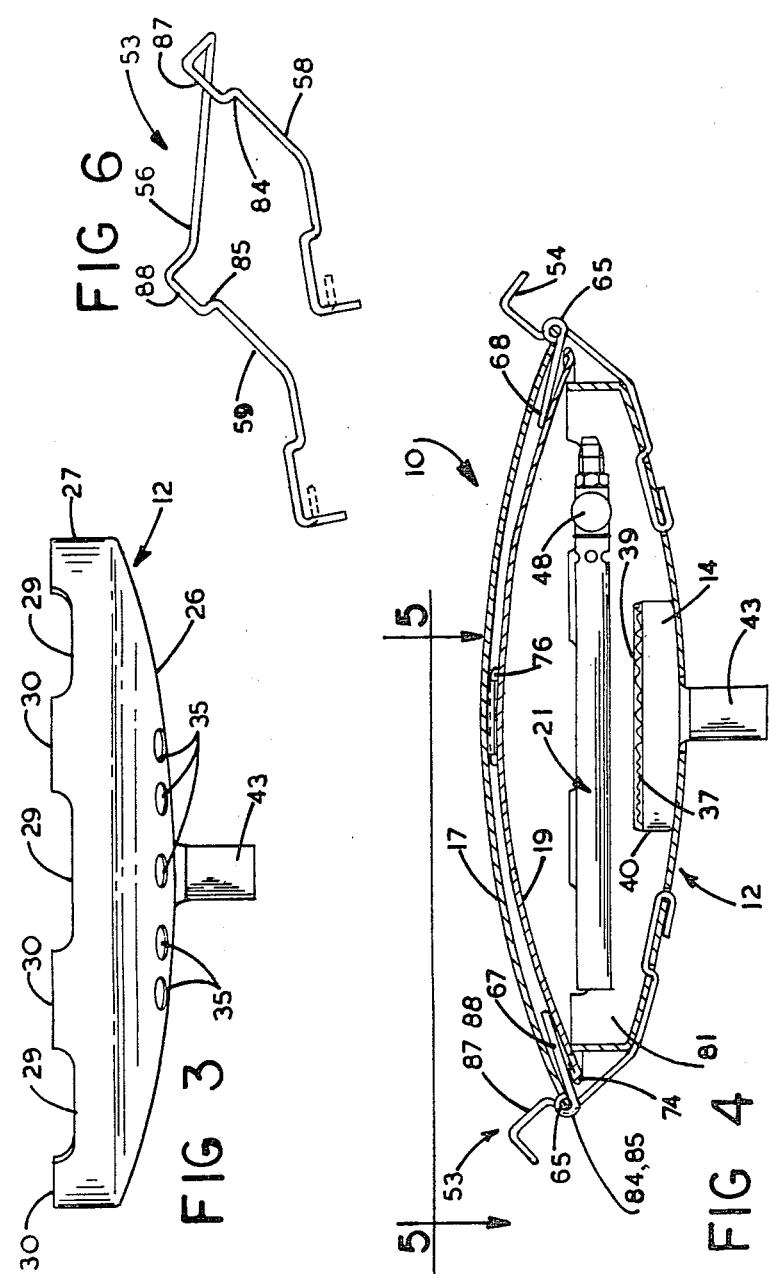

PORTABLE COOKER

BACKGROUND OF THE INVENTION

1. Field of the Invention

The invention relates to a demountable cooker, particularly of the outdoor barbeque type which is portable and uses a pressurized gas supply.

2. Prior Art

Many types of portable lightweight camping cookers or stoves are available, some of which use a pressurized gas supply, for example, a propane bottle. Some of the stoves are used as barbeque stoves in which charcoal briquettes or a substitute are heated with gas and radiant heat so produced is used to cook the food. This type of device suffers from some of the disadvantages of charcoal briquettes, for example, juices from the food fall onto the briquettes or heating elements causing smoke and also causing the food to dry out to some extent. Furthermore, such devices are usually prone to draughts and can be accidentally extinguished with consequent explosion hazards.

Some pressurized gas cookers have three or four legs and a wire grill or other type of support adapted to carry a pan above the burner. Such devices usually have an air-space between the burner and the cooker of between one and two cm. and are vulnerable to drafts. Draft shields are sometimes used but the draft shields can be inconvenient to extend and sometimes are not very effective and so, in any event, accidental extinguishing of the burner in high wind is possible.

Both types of cookers as above described can usually be dismantled to some extent. When dismantled they often result in a collection of parts which are often oily or blackened and can be lost, or in any event, are often inconvenient for storage and carrying.

SUMMARY OF THE INVENTION

The invention reduces difficulties and disadvantages of the prior art by providing a portable cooker which is simple to assembly from a folded state and, when assembled, supports a cooking pan thereon in such a manner as to reduce vulnerability to drafts. Thus it can be operated in a relatively high wind with little risk of accidental extinguishing of the flame. Furthermore, the cooking pan is dapted to retain juices from the food, thus reducing drying out of the food, and undesirable smells of juices burning on the hot portion of the cooker. Furthermore, when disassembled for storage or carrying, the cooking pan can be reversed and releasably attached to a lower support portion of the cooker to form an enclosure therewith, the enclosure holding the dismantled components of the cooker. Furthermore, the cooker is readily and easily attached to a pressurized gas bottle which has a base sufficiently large to provide a stable platform, thus eliminating the three or four legs sometimes used in some prior art structures.

A demountable cooker according to the invention is adapted to be connected to a combustible gas supply and includes a ventilated support, a burner, a cooking pan and latch means. The ventilated support has a base portion and a peripherally extending support rim disposed above the base portion. The burner is fitted adjacent and generally centrally of the base portion and has a gas delivery means. The cooking pan is adapted to be supported on the support rim and has a periphery which extends beyond the periphery of the rim when supported thereon. The pan is shaped so that when the cooker is dismantled for storage, the pan can be reversed on the support to form an enclosure with the support. The latch means is adapted to cooperate with the pan and the support to latch the pan and support together when dismantled.

In one embodiment the latch means includes a pair of support handles extending outwardly from the support and having angled portions therein adapted to engage the periphery of the pan when the pan is reversed on the support and the cooker is dismantled for storage. In another embodiment, the burner has an intake means accessible through the base portion and the gas delivery means is a rigid gas delivery tube connected to the gas supply and adapted to cooperate with the intake means to carry the burner and support thereon. In yet another embodiment a portion of the support is closed to reduce drafts and retain heat but has openings for ventilation. The support rim has a plurality of cut-outs therein to exhaust products of combustion fron the burner, upper portions of the rim between the cut-outs being adapted to control and support the pan.

In one embodiment the pan has a pair of pan handles disposed on diametrically opposite sides of the pan, the handles being adapted to extend outwardly for lifting the pan, and to be folded inwardly for storage. The support handles also serve as handles when the cooker is disassembled for storage, the support handles also being adapted to cooperate with the pan handles to reduce movement between the pan and the support when the pan is supported on the support.

A detailed disclosure following, related to drawings, describes a preferred embodiment of the invention which is capable of expression in structure other than that particularly described and illustrated.

DESCRIPTION OF THE DRAWINGS

FIG. 1 is a simplified fragmented section of a portable cooker according to the invention shown assembled for cooking, section planes being generally vertical planes adjacent a diameter thereof, FIG. 2 is a simplified fragmented top plan of a portion of the assembled cooker, as seen generally from line 2—2 of FIG. 1, FIG. 3 is a simplified side elevation of a support of the cooker, FIG. 4 is a simplified fragmented section of the cooker disassembled for storage or carrying, section planes being generally vertical planes adjacent a diameter thereof, FIG. 5 is a simplified fragmented top plan, a seen generally from line 5—5 of FIG. 4, showing portions of the components disassembled for storage, FIG. 6 is a simplified perspective of a support handle showing its general shape and means of securing the handle to the support.

DETAILED DISCLOSURE

FIGS. 1, 2 and 3

A portable cooker 10 according to the invention has a ventilated support 12, a burner 14 within the support, a cooking pin 17 and a pan lid 19. The burner is supplied with gas from a gas delivery tube 21 connected to a gas bottle 23 containing a pressurized combustible gas supply. The gas bottle has a base, not shown, sufficiently large to provide a stable platform for the cooker, thus eliminating legs commonly used in the prior art.

The ventilated support 12 is a dish-like sheet member and has a base portion 26 and a peripherally extending support rim 27 disposed above the base portion. The burner is fitted adjacent and generally centrally of the base portion 26 and is spaced below the rim 27 to provide clearance. The rim 27 has a plurality of cut-outs 29 therein, as best seen in FIG. 3, to exhaust hot gaseous products of combustion of the burner. Upper portions of the rim 30 disposed between the cut-outs contact a lower surface 31 of the pan 17 to support the pan and reduce undesirable draughts entering an enclosure 33 formed by the pan 17, the base portion 26 and the support rim 27. Thus the support and pan fit together to form the protective enclosure 33 for the burner, the cut-outs providing exhaust ventilation openings adjacent the pan, closed portions of the support tending to reduce drafts and retain the heat within the enclosure. The base portion 26 of the support 12 is shaped to be dish-like and is generally similar in curvature to the pan 17. Thus, when assembled, as in FIG. 1, it can be seen that the space between the pan 17 and base member 26 is generally constant between the center and the periphery of the support 12.

The base portion 26 has a plurality of secondary holes 35 extending around the burner to provide inlets for secondary air for combustion with the burning gas produced from orifices 37 extending around burner. The orifices 37 are formed by a top member 39 having a circular convoluted edge which engages a flat edge of a cylindrical lower member 40 to provide a plurality of peripherally extending orifices which disperse gas for combustion. The combustion occurs in an annular space or zone between a central portion of the pan and the periphery thereof, which heats a corresponding annular zone on the pan. Heat from this heated annular zone is conducted inwardly towards the center of the pan and outwardly towards the periphery thereof, and this dispersion of heat reduces a local hot spot effect found in some common camping stoves. Thus the burner tends to produce a relatively uniformly heated pan. Furthermore, heat from the burning gases is held for some time in the enclosure 33, thus promoting uniform heating of the pan.

The burner has a downwardly extending intake tube 43 which extends outwardly and axially from the base portion 26. The tube 43 has a bore to accept an upper end of the gas delivery tube 21 therein, and an annular stop means 44 to prevent the tube 21 passing into burner and to augment sealing between the tubes 21 and 43. The tube 21 can be a snug sliding fit into the tube 43 for easy assembly and disassembly. Thus the tube 43 is an intake means accessible through the base portion and cooperates with the gas delivery tube to carry the burner and support thereon.

The tube 21 has a plurality of primary air intake openings 46 adjacent an inner or lower end of the tube, which openings serve as air intake means to permit primary air to enter the tube prior to delivery to the burner so as to mix with gas from the bottle 23. A manual metering or flow control valve 48 is fitted upstream of the air intake means and adjacent the inner end of the tube, which end is releasably connected by screw threads to an outlet 49 of the bottle 23. The outlet 49 is controlled by a conventional shut-off valve 50 which can be operated by key, turn handle, or other means and is independent of the valve 48 to permit sealing of the bottle. Thus, the gas delivery tube 21 serves as a gas delivery means and is rigid and straight, and has an inner end adpated to be releasably connected to a gas supply outlet, and an outer end adapted to be releasably connected to the burner to carry the support thereon.

The support 12 includes a pair of similar support handles 53 and 54 extending from diametrically opposite sides of the support, the handles being formed from wire and shaped as will be particularly described with reference to FIG. 6. As best seen in FIG. 2, the handle 53 is generally U-shaped and has a central portion 56 and a pair of spaced parallel leg portions 58 and 59 extending inwardly towards the burner 14. The base portion 26 of the support 12 has two pairs of spaced holes 61 and 62 which are spaced symmetrically of the support and adapted to accept ends of the leg portions 58 and 59 threaded therethrough, as shown in FIG. 1. As will be described also with reference to FIG. 6, ends of the leg portions 58 and 59 extend as shown in FIG. 1 in broken outline at 58.1 and 59.1, prior to final bending to securely locate the handles relative to the support 12.

The cooking pan 17 has a periphery 65 extending beyond the periphery of the support rim 27 which supported thereon. The cooking pan is dished so as to be concave upwards when supported on the pan so as to collect food juices and liquids thereon, which results in the food tending to remain moist during cooking which contrasts with some prior art barbeque type cookers. The pan has a pair of similar pan handles 67 and 68 disposed on diametrically opposite sides of the pan. The handles 67 and 68 are hinged to the pan adjacent to the periphery thereof and are adapted to be extended outwardly for lifting the pan, as shown in FIG. 1, and can be folded inwardly to be stored against the pan, as will be described with reference to FIGS. 4 and 5. As best seen in FIG. 2, the pan handle 67 is also generally U-shaped and has a central portion 70 and a pair of generally parallel leg portions 71 and 72 extending inwardly therefrom to ends hinged on the periphery of the pan. The central portion 70 is shorter than the central portion 56 and thus the leg portions 71 and 72 of the handle 67 are disposed inwardly of the leg portions 58 and 59 of the handle 53. This permits the leg portions 71 and 72 of the handle 67 to rest on the central portion 56 of the handle 53 and be engaged by raised portions of the leg portions 58 and 59 which extend upwardly of the central portion 56, thus tending to restrict movement between the pan and the support when disposed as in FIG. 1. The raised portions of the leg portions serve other purposes, as will be described with reference to FIGS. 4 through 6. Clearly, with different relative shapes of handles, the handles of the pan could be made wider than the handle for the support with smilar cooperation between the handles. Thus, one of the pairs of handles is generally U-shaped and the remaining pair of handles is formed to fit within the U-shape of the first pair of handles so as to prevent relative rotation between the pan and the support when the cooker is assembled.

The pan lid 19 has a rim 74 having a periphery less than the periphery of the pan 17 so as to cover only a portion of the pan when supported on the pan, as shown in FIG. 1. The lid has a hinged handle 76 fitted adjacent a central portion thereof, and has a curvature generally similar to the curvature of the pan 17 so as to nest within the pan when the cooker is disassembled, as will be described with reference to FIGS. 4 and 5.

FIGS. 4 and 5

The cooker is adapted to be easily assembled from a few parts and is equally easily disassembled. The parts are so shaped as to make a compact package when disassembled, thus reducing the chances of losing the disassembled parts.

When the cooker is dismantled for storage, the pan 17 is reversed on the support so as to be disposed concave downwardly to form a second enclosure 81 with the support 12. It can be seen that the burner 14 is within this enclosure and thus is well protected from damage in carrying or storage, and a person carrying the folded assembly is protected from contamination from the burner. The gas delivery tube 21 is disconnected from the bottle and the burner and can be fitted to extend generally diametrically across the support 12. The curvature of the lid 19 is similar to the pan 17, and this permits the lid to fit within the enclosure 81 adjacent the pan, as shown, the lid 19 contacting the portions 30 of the support with the pan 17 extending beyond the lid as shown. Prior to fitting the pan 17 to cover the lid 19, the pan handles 67 and 68 are folded inwardly as shown and sandwiched between the pan lid 19 and pan 17 together with the lid handle 76. Packing materials, such as screwed up paper, can be included within the enclosure to reduce rattling of the tube 21 and lid 19.

The pair of support handles 53 and 54 extend from the support 12 to engage the periphery 65 of the pan to cooperate with the pan and support so as to latch the pan and support together when dismantled to form a compact package. The support handle 53 has angled portions 84 and 85 adapted to engage the periphery of the pan to retain the pan adjacent the support, the angled portions being partially defined by adjacent projecting portions 87 and 88. Resilience in the wire permits the periphery 65 to snap over projecting portions 87 and 88 and to seat in the angled portions 84 and 85, and the pan is then retained close to the support until outward bending of the handles permits the pan to be released. Thus, when the support 12 and the pan 17 are held together by the support handles 53 and 54, the handles serve as latch means adapted to cooperate with the pan and support to latch the pan and support together, when the cooker is dismantled and the pan is reversed on the support.

FIG. 6

The support handle 53 is shown in an intermediate condition prior to insertion and securing in the pair of holes 61 and 62 in the support, see FIGS. 1 and 2. It can be seen that the angled portions 84 and 85 are critically disposed relative to the projecting portions 87 and 88 so as to engage the periphery 65 of the pan 17 when reversed, as shown in FIG. 4. For fitting the handle to the support 12, outer ends of the leg portions 58 and 59 are threaded through the openings 61 and 62 in the support 12 (FIGS. 1 and 2) to provide a stiff location for the legs so that the support handle 53 is effectively cantilevered to extend outwardly of the support. Other means of securing the handles to the support can be substituted. Also, other types of handles can be devised which are adapted to serve as latches to reduce movement of the support and pan when cooker is assembled for cooking, as latches to hold the pan and support together when the cooker is disassembled for storage, and as handles to carry the cooker when assembled for cooking or the disassembled cooker when packed for storage. It can be seen that the angled portions 84 and 85 serve as lid engaging means to grip the lid when the lid 17 is reversed on the support, and equivalent handles can be substituted.

OPERATION

The cooker can be quickly assembled from the packed state as shown in FIG. 4. The handles 53 and 54 are sprung outwardly to release the pan 17, and the lid 19 and tube 21 are removed from the enclosure 81. The outer end of the tube 21 is threaded onto the outlet 49 of the gas bottle 23, and the intake tube 43 is slipped over the inner end of the tube 21 to carry the support on the tube 21. The gas bottle shut-off valve 50 is opened and the manual valve 48 is adjusted to attain a desired flame at the burner, which flame is usually far smaller than flames used in normal cookers because of the efficient heating of the pan due to the draft shield or insulating effect of the support rim 27. The cooking pan 17 is placed on the support so that the pan handles 67 and 68 are engaged by the handles 53 and 54 to reduce rotation between the pan 17 and support. The lid 19 can be used, if appropriate.

The support 12, cooking pan 17 and lid 19 are shown as circular, but other complimentary shapes could be substituted. Also, circular openings in the rim 27 could be substituted for the cut-out portions 29 on the upper portion 30 of the rim, and other means of ventilating the support are envisaged.

I claim:

1. A demountable cooker adapted to be connected to a pressurized combustible gas supply, the cooker having:
   (a) a ventilated support having a base portion and a peripherally extending support rim disposed above the base portion,
   (b) a burner fitted adjacent and generally centrally of the base portion, the burner having a gas delivery means for connection to the gas supply,
   (c) a cooking pan adapted to be supported on the support rim and having a periphery which extends beyond the periphery of the rim when supported thereon, the pan being shaped so that, when the cooker is dismantled for storage the pan can be reversed on the support to form an enclosure with the support, the pan having a pair of pan handles disposed on diametrically opposite sides of the pan, the handles being adapted to extend outwardly for lifting the pan, and to be folded inwardly for storage,
   (d) latch means adapted to cooperate with the pan and the support to latch the pan and the support together when dismantled, the latch means including a pair of support handles extending from the support to engage the periphery of the pan when the pan is reversed on the support, and to serve as handles when the cooker is disassembled for storage, the support handles also being adapted to cooperate with the pan handles to reduce movement between the pan and the support when the pan is supported on the support, the support handles and pan handles being further characterized by:
   (e) one of the pairs of handles is generally U-shaped,
   (f) the remaining pair of handles is formed to fit within the U-shape of the first pair of handles so as to prevent relative rotation between the pan and the support when the cooker is assembled.

2. A cooker as claimed in clam 1 further characterized by:
   (a) the cooking pan is dished so as to be concave upwards so as to collect liquid thereon, (b) the support is a dish-like member having openings therein to admit air for combustion and to exhaust hot gaseous products, the pan fitting the support to provide a protective enclosure for the burner.

3. A cooker as claimed in claim 1 or 2 further characterized by:
   (a) a pan lid having a periphery smaller than the periphery of the pan so as to cover a portion of the pan when supported on the pan, the lid being adapted to fit within the enclosure formed by the pan and the support when the cooker is disassembled for storage.

4. A cooker as claimed in claim 1 in which the latch means is further characterized by:
   (a) a pair of support handles extending from the support to engage the periphery of the pan when the pan is revesed on the support and the cooker is dismantled for storage.

5. A cooker as claimed in claim 4 further characterized by:
   (a) the support handles being formed from wire and having angled portions therein adapted to engage the periphery of the pan when the cooker is dismantled for storage,
   (b) the support handles being cantilevered to extend outwardly from the support.

6. A cooker as claimed in claim 1 further characterized by:
   (a) the gas delivery means being a tube having an air intake means to permit primary air to enter the tube prior to delivery to the burner.

7. A cooker as claimed in claim 6 in which the gas delivery means is further characterized by:
   (a) the tube is rigid and straight and has an inner end adapted to be releasably connected to a gas supply outlet and an outer end adapted to be releasably connected to the burner,
   (b) a control valve fitted upstream of the air intake means.

8. A cooker as claimed in claim 1 in which the support is further characterized by:
   (a) the support rim having a plurality of cut-outs therein to exhaust products of combustion from the burner, and upper portions of the rim between the cut-outs being adapted to control and support the pan.

9. A demountable cooker adapted to be connected to a pressurized combustible gas supply, the cooker having:
   (a) a ventilated support having a base portion and a peripherally extending support rim disposed above the base portion,
   (b) a burner fitted adjacent and generally centrally of the base portion, the burner having a gas delivery means for connection to the gas supply,
   a cooking pan adapted to be supported on the support rim and having a periphery which extends beyond the periphery of the rim when supported thereon, the pan being shaped so that, when the cooker is dismantled for storage the pan can be reversed on the support to form an enclosure with the support,
   (d) latch means adapted to cooperate with the pan and the support to latch the pan and the support together when dismantled, the latch means including a pair of support handles formed of wire and being cantilevered to extend outwardly from the support, the support handles having angled portions therein adapted to engage the periphery of the pan when the pan is reversed on the support and the cooker is dismantled for storage.

10. A cooker as claimed in claim 9 further characterized by:
    (a) a pair of pan handles disposed on diametrically opposite sides of the pan, the handles being adapted to extend outwardly for lifting the pan, and to be folded inwardly for storage,
    a pair of support handles also serve as handles when the cooker is disassembled for storage, the support handles also being adapted to cooperate with the pan handles to reduce movement between the pan and the support when the pan is supported on the support.

11. A cooker as claimed in claim 10 further characterized by:
    (a) one of the pairs of handles is generally U-shaped,
    (b) the remaining pair of handles is formed to fit within the U-shape of the first pair of handles so as to prevent relative rotation between the pan and the support when the cooker is assembled.

* * * * *